US012670452B2

(12) United States Patent
Blum et al.

(10) Patent No.: US 12,670,452 B2
(45) Date of Patent: *Jun. 30, 2026

(54) SYSTEMS AND METHODS FOR SKILLS INFERENCE USING A DATASTORE AND MODELS

(71) Applicant: EMPATH, INC., Austin, TX (US)

(72) Inventors: Adam Blum, Austin, TX (US); Vladislav Khizanov, Austin, TX (US)

(73) Assignee: Talent Mobility, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,285

(22) Filed: Feb. 16, 2024

(65) Prior Publication Data

US 2024/0232743 A1     Jul. 11, 2024

Related U.S. Application Data

(63) Continuation of application No. 17/471,083, filed on Sep. 9, 2021, now Pat. No. 11,934,978.

(60) Provisional application No. 63/076,052, filed on Sep. 9, 2020.

(51) Int. Cl.
*G06Q 10/0631* (2023.01)
*G06N 5/04* (2023.01)
*G06N 20/00* (2019.01)

(52) U.S. Cl.
CPC ....... *G06Q 10/063112* (2013.01); *G06N 5/04* (2013.01); *G06N 20/00* (2019.01)

(58) Field of Classification Search
CPC ..... G06Q 10/063112; G06Q 10/06398; G06N 5/04; G06N 20/00
See application file for complete search history.

(56) References Cited

U.S. PATENT DOCUMENTS

| | | | |
|---|---|---|---|
| 10,839,157 B2 | 11/2020 | Chen | |
| 11,934,978 B2 * | 3/2024 | Blum | G06N 20/00 |
| 11,961,156 B2 * | 4/2024 | Aguilar Achiaga | G06Q 10/105 |

(Continued)

FOREIGN PATENT DOCUMENTS

| | | | | |
|---|---|---|---|---|
| EP | 3910575 A1 * | 11/2021 | | G06F 16/285 |
| JP | 2002-157380 A | 5/2002 | | |
| JP | 2007-241673 A | 9/2007 | | |

OTHER PUBLICATIONS

International Search Report and Written Opinion dated Dec. 29, 2021, for PCT App No. PCT/US2021/049729, 8 pgs.

(Continued)

*Primary Examiner* — Dylan C White

(74) *Attorney, Agent, or Firm* — PROCOPIO, CORY, HARGREAVES & SAVITCH LLP

(57) ABSTRACT

A system comprising: a skills data store; an employee action data store; at least one hardware processor; and one or more software modules that are configured to, when executed by the at least one hardware processor, retrieve skills data and employee action data from the skills data store and employee action data store, train a classification model, wherein training a classification model comprises performing feature preprocessing, generating an LDA topic vector and TF/IDF Word2Vec similarity scoring, and use AutoML to train ML models, and infer employee skills and levels based on the classification model and employee action data.

7 Claims, 4 Drawing Sheets

(56)                    References Cited

U.S. PATENT DOCUMENTS

| | | | | |
|---|---|---|---|---|
| 2003/0182178 A1* | 9/2003 | D'Elena | .......... | G06Q 10/06398 |
| | | | | 705/7.14 |
| 2017/0344954 A1* | 11/2017 | Xu | ........................ | G06F 16/242 |
| 2018/0253655 A1* | 9/2018 | Wang | ..................... | G06Q 50/01 |
| 2020/0005194 A1 | 1/2020 | Rao et al. | | |
| 2020/0034776 A1* | 1/2020 | Peran | ..................... | G06N 5/022 |
| 2020/0311683 A1* | 10/2020 | Chua | ........................ | G06F 18/22 |
| 2020/0349199 A1 | 11/2020 | Jayaraman | | |
| 2024/0020618 A1* | 1/2024 | Singh | ............. | G06Q 10/063112 |

OTHER PUBLICATIONS

International Preliminary Report on Patentability dated Mar. 23, 2023, for PCT App No. PCT/US2021/049729, 5 pgs.

* cited by examiner

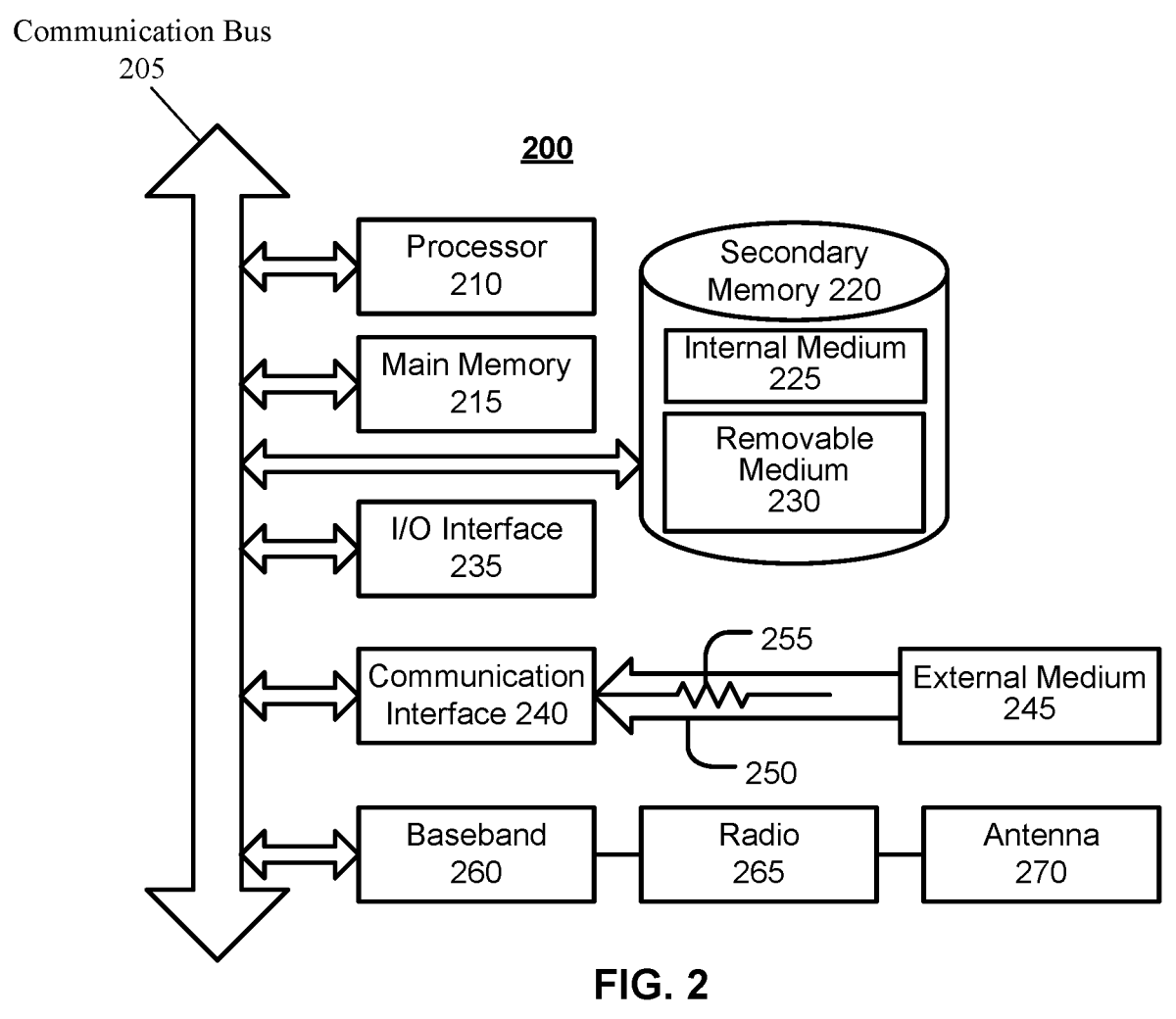

Communication Bus
205

200

Processor
210

Main Memory
215

I/O Interface
235

Secondary
Memory 220

Internal Medium
225

Removable
Medium
230

Communication
Interface 240

255

External Medium
245

250

Baseband
260

Radio
265

Antenna
270

FIG. 2

SYSTEMS AND METHODS FOR SKILLS INFERENCE USING A DATASTORE AND MODELS

CROSS-REFERENCE TO RELATED APPLICATIONS

This application is a continuation of U.S. application Ser. No. 17/471,083, filed Sep. 9, 2021, entitled, "SYSTEMS AND METHODS FOR SKILL INFERENCE USING A DATASTORE AND MODELS", claiming priority to U.S. Provisional Patent App. No. 63/076,052, filed on Sep. 9, 2020, the disclosures of which are incorporated herein by reference as if set forth in full.

BACKGROUND

Field of the Invention

The embodiments described herein are generally directed to inventorying and tracking the presence of worker skills, and more particularly, to preprocessing employee action data and skill descriptions to allow the presence or absence of a skill, and the skill's proficiency level, to be predicted accurately.

Description of the Related Art

Most large companies utilize some form of skill framework to express job requirements and to identify what skills members of their workforce have. These skill frameworks typically are an enumeration of hundreds of specific skills. These skills often have proficiency levels with behavioral descriptors. While the value of identifying skills for job roles is almost universally acknowledged, few organizations believe that the skills listed are either comprehensive or current with the capabilities of their workers.

SUMMARY

Accordingly, systems, methods, and non-transitory computer-readable media are disclosed to preprocess employee action data and skill descriptions to allow the presence or absence of a skill, and the skill's proficiency level, to be predicted accurately.

In an embodiment, A system comprising: a skills data store; an employee action data store; at least one hardware processor; and one or more software modules that are configured to, when executed by the at least one hardware processor, retrieve skills data and employee action data from the skills data store and employee action data store, train a classification model, wherein training a classification model comprises performing feature preprocessing, generating an LDA topic vector and TF/IDF Word2Vec similarity scoring, and use AutoML to train ML models, and infer employee skills and levels based on the classification model and employee action data.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 2 illustrates an example processing system, by which one or more of the processes described herein, may be executed, according to an embodiment;

DETAILED DESCRIPTION

In an embodiment, systems, methods, and non-transitory computer-readable media are disclosed for a machine learning-based model with many features for each of the data signals for employee actions. These features each attempt to capture some aspect of the meaning similarity between the various feeds of employee-related data and the skills and proficiency level descriptions. The various attributes of employee actions and behavior are available in the vast majority of organizations' information technology infrastructure. This allows a common machine learning model structure to be used across organizations (even if the model is trained separately for each organization and its skills). Examples of the data signals used include task assignments for employees, projects worked on, internal collaboration chat and feedback received on reviews.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Figure 1:
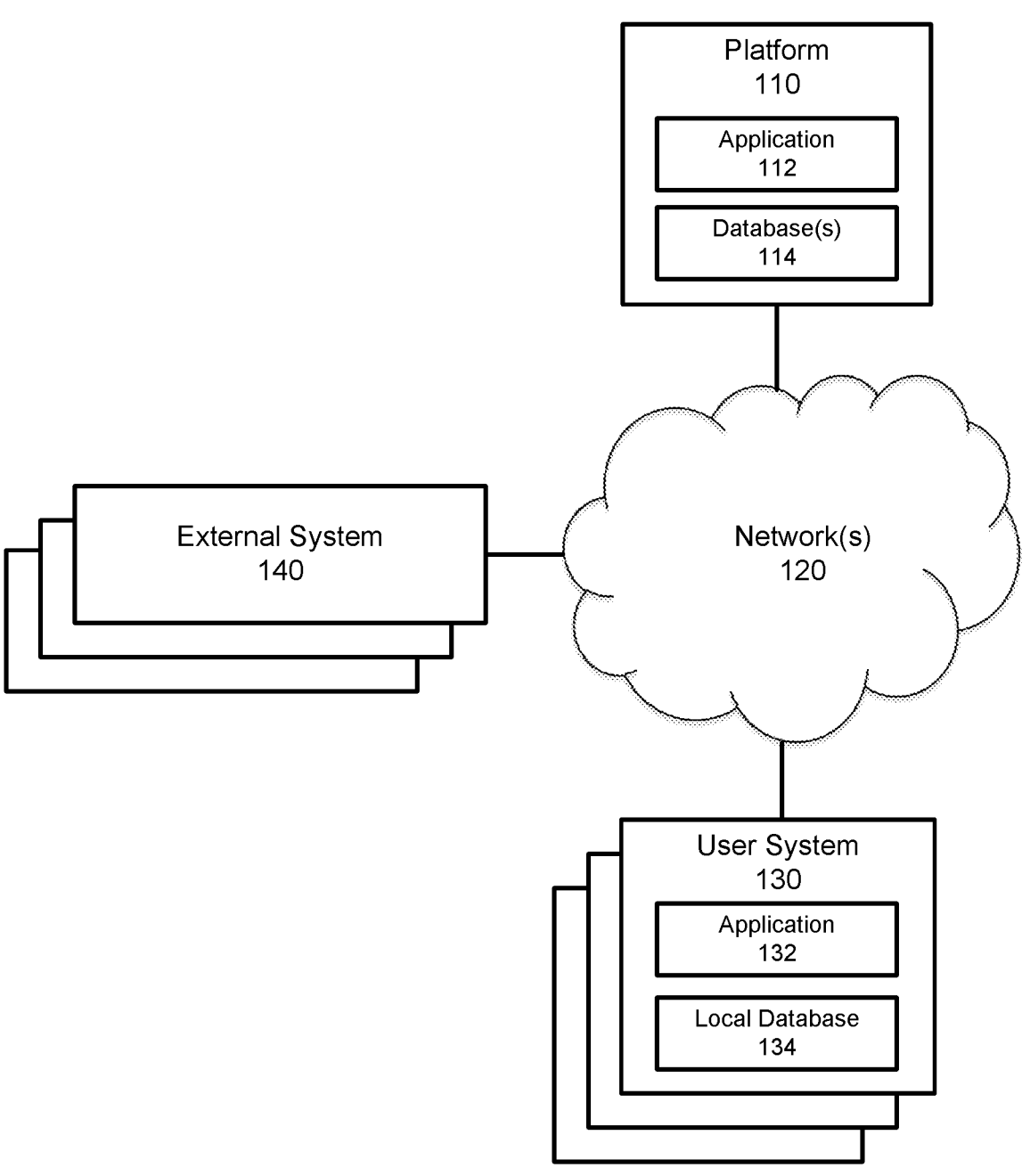
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in extensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions of the application described herein.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

Embodiments of processes for preprocess employee action data and skill descriptions to allow the presence or absence of a skill, and the skill's proficiency level, to be predicted accurately will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for case of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Thus, a platform such as platform 110 can be configured to implement the machine learning-based model with many features for each of the data signals for employee actions. Again, these features each attempt to capture some aspect of the meaning similarity between the various feeds of employee-related data and the skills and proficiency level descriptions. The various attributes of employee actions and behavior are available in the vast majority of organizations' information technology infrastructure. This allows a common machine learning model structure to be used across organizations, even where the model is trained separately for each organization and its skills. Examples of the data signals used include task assignments for employees, projects worked on, internal collaboration chat, feedback received on reviews, etc.

The features used for each employee actions and information fragment are measures of similarity in meaning between each employee action fragment and the skill description, i.e., the skill statement and behavioral descriptors, using topic model vectors. Specifically, each feature has similarity to the skill description based on the distance between the topics expressed on the two documents. The topic vector approach allows us to establish employee actions that are similar in meaning to the skill without assuming that they have keywords in common.

Each employee "action fragment", i.e., text from a specific feed of employee actions and behavior as described below, is compared to the full skill description based on the topic vector distance to get semantic similarity score. Each of the categories of employee action has multiple instances over time. The maximum and average similarity scores are both then features used in the machine learning binary classification model. The target of the model is whether or not the employee actually has the skill.

After training against a set of labeled data of known accurate employee to skill mappings, the classification model can then infer accurate mappings for unseen employees.

This predictive model is embedded in a larger system that: presents employees with their inferred skills; allows them to confirm or deny those skills, infers the presence of skills over time as new employee actions are retrieved from a company's systems, and tracks accuracy of the classification model over time and retrains the model when the classification model has been determined to have degraded below a threshold of acceptable accuracy.

Note that a separate regression model can be used to predict the proficiency level of each skill an employee possesses, using a similar process based on texts representing employee actions and behaviors.

Figure 3:
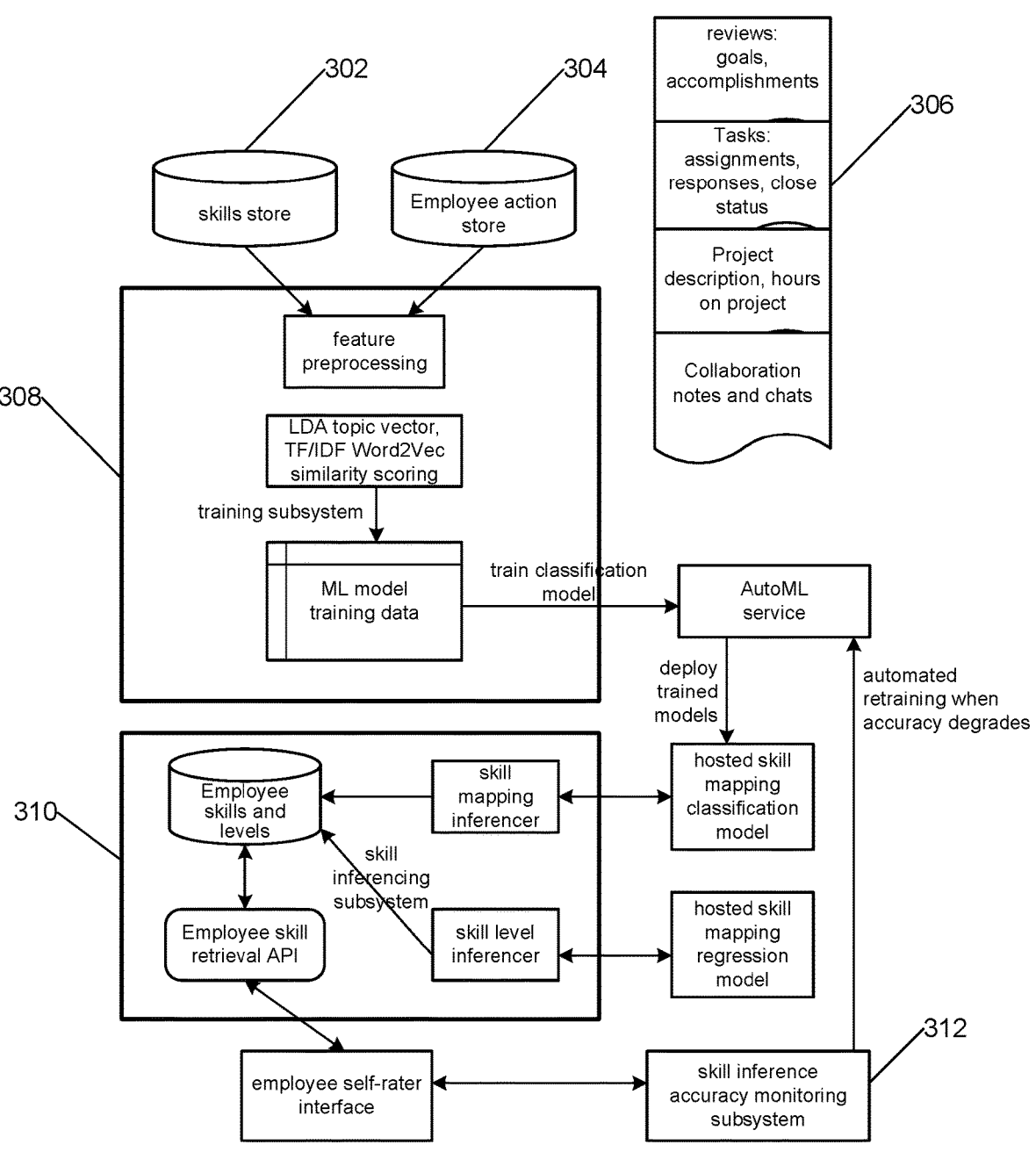
FIG. 3 illustrates an example system 300 that can be implemented in the infrastructure of FIG. 1 for preprocess employee action data and skill descriptions to allow the presence or absence of a skill, and the skill's proficiency level, to be predicted, according to an embodiment.

FIG. 3 illustrates an example system 300 that can be implemented in the infrastructure of FIG. 1 for preprocess employee action data and skill descriptions to allow the presence or absence of a skill, and the skill's proficiency level, to be predicted. As can be seen, of a set of data stores 302 and 304 with data 306, which can be implemented as databases 114 and/or 134 concerning skills and employee actions, a training subsystem 308 that generates the classification models, the inferencing subsystem 310 that classifies skills as applying to employees as new data on employees arrives, the skills assessment interface that allows the accuracy of inferred skills to be assessed by subject matter experts (the employee or their supervisor), the skill mapping retrieval system which reports the current skill state of employees, and the accuracy monitoring subsystem 312 that insures that the inferences remain accurate enough.

As noted, data store 302 can be populated on an initial basis with a set of skills and proficiency levels of those skills. Skills can have titles, descriptions and a provision for an exemplar that disambiguates the skill's meaning. The exemplar can, e.g., be a dictionary or Wikipedia entry that is consistent with the meaning of the skill. Thus, the, e.g., "Python" skill can have the dictionary definition of the programming language, not a large snake. If the skills have proficiency levels the behavioral descriptions of the proficiencies are included in the skill data store. Information about employee actions is also copied and aggregated from multiple external systems in the company and can be stored in data store 304. These "action descriptions" can include: tasks assigned to the employee; work performed in response to the task assignment; projects worked by the employee (descriptions of the entire project); hours worked on those projects; performance reviews for employee, deconstructed into goals, accomplishments and feedback (each of which is treated as a separate signal); internal collaboration system chat entries.

The employee information can then be mapped to skills. For employee to skill mapping task two problems can be solved: determine whether an employee possess particular skill and then at which proficiency level. The first problem is solved by training a binary classification model using the F1 score (the harmonic mean between precision and recall) as a target metric (since positive class is of more interest), while for the second problem a regression model with mean squared error metric can be used. An exponential transform to the target to reflect the fact that mastering a skill is harder than advancing it at early steps can also be used.

In order to reduce dimensionality of the data (and consequently prevent overfitting) machine learning algorithms can be trained on similarity scores between skill description and various employee features, which include: accomplishments, goals, feedback, and project experience from one or multiple system (treating them as separate features).

TF-IDF, LDA and Word2Vec language models can be used to embed text description into vector space and calculate cosine similarity between those vectors. TF-IDF model is used as a baseline model. The model can be trained on the skill description corpus to find keywords relevant for particular skill. LDA model implicitly defines topics, which allows to match descriptions with low number of intersecting words. This is possible due to employee and skill descriptions comprise words from the same topic, but using disjoint words to describe it. The Word2vec model takes advantage of being trained on large text corpus and learn semantic similarity between words tuned for the particular problem domain. This approach provides a "smooth" way to compare descriptions as words similarity varies continuously depending on their semantic similarity.

In order to increase keyword matching (particularly important for TF-IDF scoring) stemming and lemmatization can be applied as well as synonyms and acronyms expansion to text data. Lemmatization is applied first to extract the correct root form of the word. However, if the word is missing from the WordNet dictionary (which is used by lemmatizer), it fails to normalize it. For example, the word "APIs" will remain the same after lemmatization. In such cases we apply stemming algorithm over the lemmatized sentences, and the word "APIs" will be transformed to "api". "Exemplars" are also used, which are particularly representative Wikipedia entries or other long form fragments of text about the skill to compensate for the occasionally too terse skill descriptions.

Common relations to third-party objects that are associated with both skills and employees can also be taken advantage of. These include the count of courses that an employee has taken and has been identified to be related to the skill. It also includes a count of job titles that the employee has had and which require the skill.

As described above, the models are trained on human-labelled data of skills possessed by each employee. The models can be retrained when new ground truth data appears. In order to speed up the process (which is important since the amount of all possible employees and skills is prohibitively large) specific structure for employee description can be introduced. It is comprised of mappings, i.e.: "employee"→"feature"→"value", where "employee" is a unique employee ID, "feature" is the feature name (e.g. accomplishment, goal, etc.) and "value" is text data for given employee and feature. Note, that employee may have a flexible number of features and for each feature several descriptions can be provided. Vectorized functions can be used for calculating similarity scores which significantly speeds up feature preparation.

The tables that follow describe the original separate data feeds and how they are transformed to specific machine learning model features.

TABLE 1

Employee Related Source Data

| Data Input | Description |
| --- | --- |
| Review goals | Goals chosen by employee to achieve until a predefined deadline. |
| Review accomplishments | Summary about which goals has been achieved (fully or partially) by employee |
| Review feedback | Feedback from manager about employee's overall performance |
| Project history | Project summary employee has been working on and number of hours have been spent for each project |
| Employee_job relations | Employee to job many-to-many relation |
| Job_skill relations | Job to skill many-to-many |
| Tasks | Tasks assigned to employee and work performed on it |
| Chat | Chat entries from internal chat system (e.g. Slack, MS Teams, etc) |

TABLE 2

Skill Related Source Data
Data Input

Skill title
Skill description
Skill "exemplar"

Acronym/synonym expansion, stemming/lemmatization, TF-IDF/LDA/W2V, cosine similarity feature preprocessing is comprised of the following steps: (1) Acronym expansion—given a dictionary with acronyms definition, this step augments the data with full statements for each acronym. The original acronym is preserved in text in order for TF-IDF model to take advantage of it. (2) Synonym expansion—using WordNet language model, this step augments nouns with synonyms. This increases intersection of words between entities which helps to improve description similarity. (3) Stemming/lemmatization—this step tries to normalize words for TF-IDF and LDA models to make them 1-to-1 match. (4) Vectorize text—these models are trained (except Word2vec) on the text corpus and used to transform text description into numeric vectors to feed them into ML algorithms: (a) TF-IDF—this model is a baseline, which roughly counts the number of intersecting words and weights them by relevance to a particular document; (b) LDA—this model tries to extract topics from text. This allows matching relevant documents with a low number of intersecting words via topics; and (c) Word2vec—this model allows matching documents even without common words by employing semantic similarity. This is feasible due to w2v model has been trained on a very large text corpus. (5) Cosine similarity—this similarity measure compares numeric vectors for similarity "on average". We apply it to all combinations of employee and skill features in vectorized representation.

The following table 3 summarizes the features and target for the employee to skill "mapping inference model" which predicts whether the employee has the skill.

TABLE 3

Feature goal to skill description TF-IDF vector similarity
accomplishment to skill description TF-IDF vector similarity
feedback to skill description TF-IDF vector similarity
project history to skill description TF-IDF vector similarity
goal to skill description LDA vector similarity
accomplishment to skill description LDA vector similarity
feedback to skill description LDA vector similarity
project history to skill description LDA vector similarity
goal to skill description W2V vector similarity
accomplishment to skill description W2V vector similarity
feedback to skill description W2V vector similarity
project history to skill description W2V vector similarity
goal to skill title TF-IDF vector similarity
accomplishment to skill title TF-IDF vector similarity
feedback to skill title TF-IDF vector similarity
project history to skill title TF-IDF vector similarity
goal to skill title W2V vector similarity
accomplishment to skill title W2V vector similarity
feedback to skill title W2V vector similarity
project history to skill title W2V vector similarity
goal to skill "exemplar" TF-IDF vector similarity
accomplishment to skill "exemplar" TF-IDF vector similarity
feedback to skill "exemplar" TF-IDF vector similarity
project history to skill "exemplar" TF-IDF vector similarity
goal to skill "exemplar" LDA vector similarity
accomplishment to skill "exemplar" LDA vector similarity
feedback to skill "exemplar" LDA vector similarity
project history to skill "exemplar" LDA vector similarity
task to skill title TF-IDF vector similarity
task result to skill title TF-IDF vector similarity
chat entries to skill title TF-IDF vector similarity
task to skill description TF-IDF vector similarity
task result to skill description TF-IDF vector similarity
chat entries to skill description TF-IDF vector similarity
task to skill title LDA vector similarity
task result to skill title LDA vector similarity
chat entries to skill title LDA vector similarity
task to skill description LDA vector similarity
task result to skill description LDA vector similarity
chat entries to skill description LDA vector similarity
task to skill title W2V vector similarity
task result to skill title W2V vector similarity
chat entries to skill title W2V vector similarity
task to skill description W2V vector similarity
task result to skill description W2V vector similarity
chat entries to skill description W2V vector similarity
Total hours worked on project
Jobs in common
Courses in common
Target: mapped_actual
Target: skill_level Automating retraining to create accurate models can start with a heuristic algorithm weighting the various language similarity scores. Employees can then label the inferred skills as correct or not. Once a sufficient number of employees respond, we train the model based on the labeled data. As new employees continue to respond we retrain after a threshold of new labelled data. The assumption is that more labelled data will improve the model's real world accuracy and be less vulnerable to overfitting.

Specifically, if there is an already trained model in place, it can be evaluated given new data first and depending on the evaluation results either deploy the model or stay with the old one. For evaluation e overall statistics (the F1 score) can be used and compared to respective cross-validation metrics for the previously trained model.

Historical results of training can be used with additional labeled data to optimize the number of newly labeled employee data that is needed to trigger a retrain event. Specifically, the "cost of wrong inferences" (which is supplied by the organization) can be used and the estimated improvements in accuracy for a given number of employees to optimize the timeframe for retraining. We use this method to balance the benefit of more accurate models with the cost of training, optimizing the overall cost.

Figure 4:
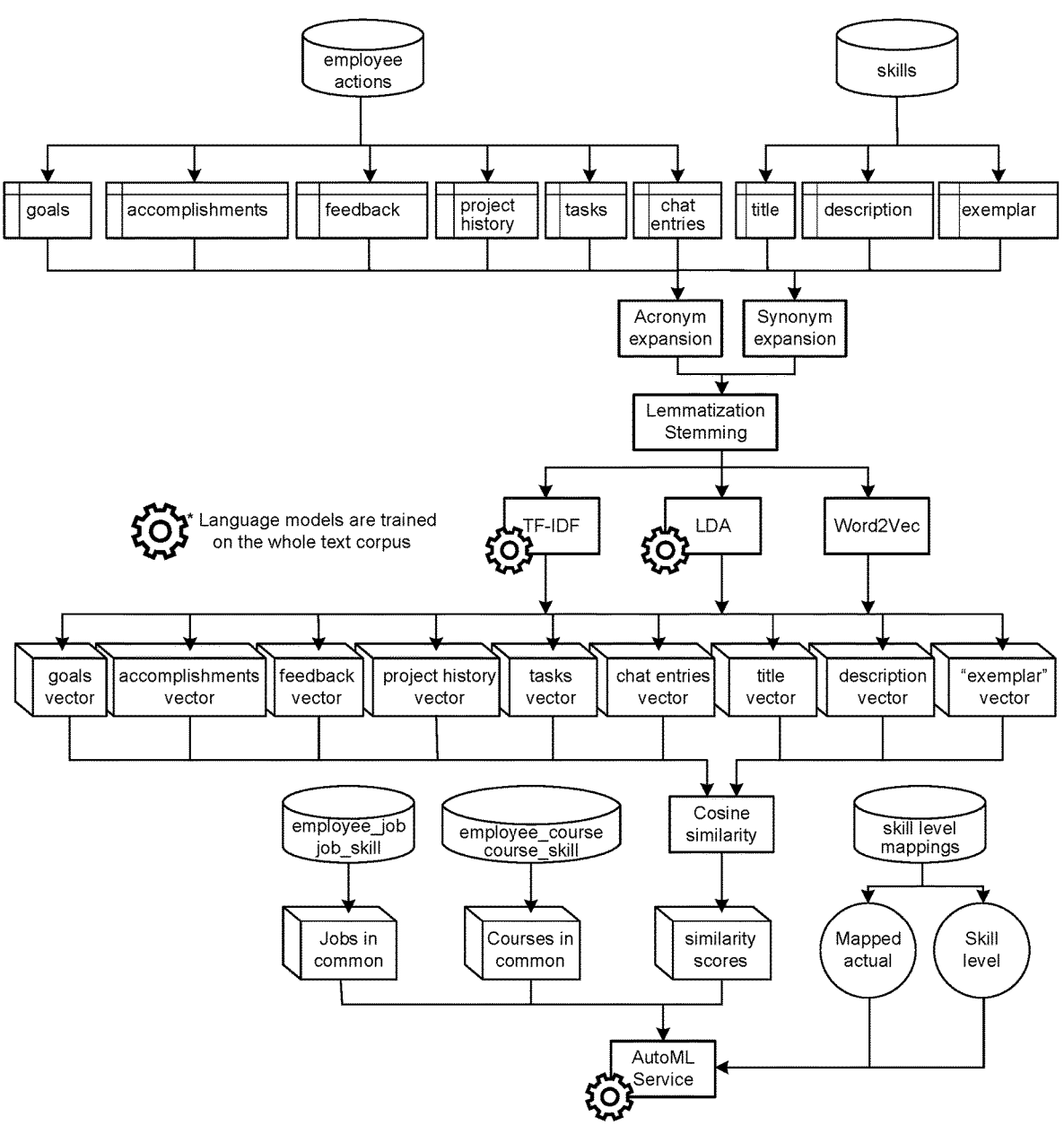
FIG. 4 is a diagram illustrating an example processing diagram in accordance with one embodiment.

FIG. 4 is a diagram illustrating an example processing diagram in accordance with one embodiment.

Processing Example

I. Given an employee John Doe we have the following signals for him:
goals
    get better at Python
    deeper SQL database knowledge
    document all APIs
accomplishments
    implemented Python classes to help the broader team
    implemented several SQL stored procedures to speed up the app
    documented all API via OpenAPI and Swagger on Postman
feedback
    John is very talented Java developer; his codebase is well documented and covered by tests
    He is results oriented and is highly focused on our team's success
amp_work_history
    Lead Account Executive between customer and internal departments
att_experience
    -
taleo_experience
    Leaded team of java developers, worked on API for internal DB
II. For skill Python we have the following information:
title
    Python
description
    Knowledge of a specific technology, software product or product group. Describes basic concepts of the product using relevant language. Describes major product functions, features and capabilities. Explains sources for product literature, reference materials and tutorials.
exemplar
    Python is an interpreted, high-level, general-purpose programming language. Created by Guido van Rossum and first released in 1991, Pythons design philosophy emphasizes code readability with its notable use of significant whitespace. Its language constructs and object-oriented approach aim to help programmers write clear, logical code for small and large-scale projects.

The data is processed by adding acronym and synonym expansion and then applying stemming and lemmatization. After these steps the data look as follows:
goals
    get better at python deeper sql structured query language database knowledge document all api application programming interface
accomplishments
    implemented python classes to help the broader team implemented several sql structured query language speech communication spoken communication voice communication oral communication stored procedures operation to speed up the app documented all api application programming interface via openapi and swagger on postman
feedback
    john is very talented Java developer his codebase is well documented and covered by tests he is results oriented and is highly focused on our team success
amp_work_history
    lead account executive between customer and internal departments
att_experience
    -
taleo_experience
    leaded team of java developers, worked on api application programming interface for internal db database
title
    python
description
    knowledge of a specific technology software product or product group describes basic concepts of the product using relevant language describes major product functions features and capabilities explains sources for product literature reference materials and tutorials
exemplar
    python is an interpreted highlevel generalpurpose programming language created by guido van rossum and first released in pythons design philosophy emphasizes code readability with its notable use of significant whitespace its language constructs and objectoriented approach aim to help programmers write clear logical code for small and largescale projects The TF-IDF and LDA models are trained on the whole text corpus and convert each signal into vectorized representation. TF-IDF embedding size equals vocabulary size (4350 in this case), while LDA equals to number of topics defined by user (128 in this case). For Word2vec model we used a pretrained glove-wiki-gigaword-300 model with embedding size equal to 300.

The TF-IDF embedded signals look as follows:
accomplishments_tfidf: [0.24, 0.03, 0.11, 0.18, 0.21, 0.19, . . . ]
goals_tfidf: [0.54, 0.13, 0.01, 0.28, 0.01, 0.09, . . . ]
feedback_tfidf: [0.21, 0.40, 0.27, 0.01, 0.12, 0.91, . . . ]
amp_work_history_tfidf: [0.21, 0.40, 0.27, 0.01, 0.12, 0.91, . . . ]
att_experience_tfidf: [0.24, 0.13, 0.32, 0.17, 0.0, . . . ]
taleo_experience_tfidf: [0.35, 0.37, 0.34, 0.45, 0.05, . . . ]
title_tfidf: [0.45, 0.28, 0.18, 0.04, 0.51, . . . ]
description_tfidf: [0.58, 0.15, 0.42, 0.66, 0.43, . . . ]
exemplar_tfidf: [0.11, 0.12, 0.43, 0.6, 0.21, . . . ]

Other embeddings (e.g. LDA, W2V) can have the same form but differ in dimensions and actual values.

Given that the cosine similarity is calculated between all combinations of features:

tfidf_accomplishments_description: 0.17
tfidf_amp_work_history_title: 0.01
lda_feedback_exemplar: 0.34

Finally, supplementary features are added, such as jobs in common, etc. and target value, which is mapped_actual for mapping model and skill_level for skill level model:

jobs_in_common: 1
courses_in_common: 7
mapped_actual: True

Combining all together we use AutoML to train ML models which learns a mapping [0.17, 0.01, 0.34, . . . , 1, 7]$\rightarrow$ True.

The math that is used is as follows: Let E be a set of all employees and S be a set of all skills. Define a function $\varphi$: $E \times S \rightarrow L$ where L is a set of skill levels plus 0 for non-mapped employee-skill pairs. The goal is to learn function $\varphi$ given its true values only for a subset of pairs. In order to learn the mapping employee-skill pairs are embedded into "space of similarity scores" (which is essentially $R^d$) and then train machine learning algorithms (via AutoML service) using embedded space as features and labels as target.

Each employee and skill comprises its own signals. For employee it might be $\Phi_e=$\{goal, feedback, . . . \} and for skill $\Phi_s=$\{description, wiki, . . . \}. Several language models are then employed, such as TF-IDF, LDA and Word2vec to convert each signal into vectorized representation. Denote by $\Psi$: $D \rightarrow R^d$ an embedding operator (e.g. TF-IDF language model) which acts on document domain D. Here d is an embedding dimension (e.g. vocabulary size in case of TF-IDF model).

An embedding operator is applied pointwise to each employee and skill signal (e.g. $\Psi(e) \in R^{|\Phi_e| \times d}$) and calculate outer product between employee and skill vectors $\Psi(e) \otimes \Psi(s) \in R^{|\Phi_e| \times |\Phi_s|}$ which results in a similarity matrix between all employee-skill signal combinations.

Finally, we repeat the same process for each other language model and get a feature vector for single employee-skill pair $v \in R^{|M| \times |\Phi_e| \times |\Phi_s|}$. Here M denotes the space of all language models. This way our inputs to ML model are:

model matrix $X \in R^{n \times m}$ and
target vector $y \in R^n$, where $n=|E| \times |S|$ and $m=|M| \times |\Phi_e| \times |\Phi_s|$.

The skills inference subsystem uses new information coming into the skill and employ action store to make new predictions of employee skills and proficiency levels. Specifically, each employee and each skill are classified as "mapped or not" by the machine learning model. A separate inference model is used to predict the level of proficiency for each skill. These are all stored in the employee skills and levels store. This store is a table with foreign keys to the employees table and skills table for each employee-skill combination. For efficiency only the positive (True) values are stored in the table. The model will almost always be unbalanced with mostly negatives (False) inferred for each skill for each employee. For each of the positives the inferred proficiency level is also stored.

All of this processed information is available via the Employee Skill Retrieval API. The primary endpoint of this API returns a payload of mapped skills and proficiency levels for each employee. Only the positive skills are returned by the API. Thus, the consumption and processing of these inferences is very simple: query for a specific employee and receive back a payload of all of their skills and proficiency levels.

The skills retrieval API is used by the Skills Self-Rater. The Skills Self-Rater allows the employee to assess the accuracy of the inferences. They can confirm or deny both the inferred skills and levels for themselves and choose other skills that may not have been inferred at all. Actual values for each employee are sent to the accuracy monitoring subsystem A rarely acknowledged fact in usage of machine learning models is that they almost universally degrade in the face of changing real world situations. The language used to describe employee actions using the skill inferred will change over time. The accuracy monitoring subsystem takes data from the skills self-rater and sends it to an accuracy monitoring subsystem. The accuracy monitoring subsystem uses several aspects of the ongoing results of the model to determine when to retrain: the overall aggregate accuracy of inferences since the last time the model was trained, recent accuracy over several time intervals (steep drops in accuracy over a short time period are strong indicators of the necessity to retrain), and large changes in the underlying feature values (language similarity scores) also indicate a necessity to retrain.

The automated retraining and evaluation process describe to create accurate models based on newly supplied employee labeled data on skills is then used to retrain and consider new models in the face of measured drops in accuracy. The administration interface for the accuracy monitoring subsystem allows thresholds for each of these values to be set. Suggestions are presented for values for those thresholds that attempt to balance "cost of inaccurate inferences" with the cost of retraining.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A system comprising:

a skills data store comprising skill descriptions for a plurality of employees associated with a plurality of companies;

an employee action data store comprising employee action data for the plurality of employees;

at least one hardware processor; and one or more software modules are configured to, when executed by the at least one hardware processor, for each of the plurality of companies and the plurality of employees associated therewith:

retrieve the skill descriptors and employee action data from the skills data store and employee action data store, convert the skill descriptors and employee action data to topic vectors, compare the employee action data to the skill descriptors using the topic vectors, generate a maximum and average semantic similarity scores based on topic vector differences between the skill descriptors and employee action data;

based on the maximum and average semantic similarity scores associated with each of the plurality of companies, generate a classification model based on the maximum and average semantic similarity scores;

train the classification model based on known accurate employee to skill mappings, wherein training a classification model comprises performing acronym/synonym expansion, stemming/lemmatization, vectorizing text in order to generate an LDA topic vector model and TF/IDF Word2Vec similarity scoring model, and cosine similarity feature preprocessing;

infer employee skills and levels, for the plurality of employees, based on the classification model and employee action data; and track the accuracy of the classification model over time as new employee action data is received; and automatically retrain the classification model when the tracking indicates that the classification model accuracy has degraded below a threshold.

2. The system of claim 1, wherein acronym expansion comprises given a dictionary with acronyms definition, augmenting the data with full statements for each acronym, and wherein the original acronym is preserved for use with a TF-IDF model.

3. The system of claim 1, wherein synonym expansion comprises using a WordNet language model to augment nouns with synonyms to increase the intersection of words between entities, which helps to improve description similarity.

4. The system of claim 1, wherein stemming/lemmatization comprises normalizing words for TF-IDF and LDA models to make them a 1-to-1 match.

5. The system of claim 1, wherein vectorizing text comprises training models TF-IDF and LDA models on a text corpus and transforming text description into numeric vectors to feed them into ML algorithms.

6. The system of claim 5, wherein the TF-IDF model is a baseline, which roughly counts the number of intersecting words and weights them by relevance to a particular document, and wherein the LDA model is configured to extract topics from text to allow matching relevant documents with a low number of intersecting words via topics, and wherein the Word2vec model allows matching documents even without common words by employing semantic similarity.

7. The system of claim 1, wherein cosine similarity feature preprocessing comparing numeric vectors for similarity on average.

\* \* \* \* \*